June 7, 1927.

H. STUKART

BREAD SLICER

Filed Dec. 31, 1923

Inventor:
Hendrik Stukart
By Nissen & Crane
Attys.

June 7, 1927. 1,631,231
H. STUKART
BREAD SLICER
Filed Dec. 31, 1923 7 Sheets-Sheet 2

Fig.3 Fig.4

Inventor:
Hendrik Stukart
By Nissen & Crane
Attys.

June 7, 1927.

H. STUKART

BREAD SLICER

Filed Dec. 31, 1923

Inventor:
Hendrik Stukart
By Nissen & Crane Attys.

June 7, 1927.

H. STUKART

BREAD SLICER

Filed Dec. 31, 1923

Inventor:
Hendrik Stukart
By Hazen & Crane

Patented June 7, 1927.

1,631,231

UNITED STATES PATENT OFFICE.

HENDRIK STUKART, OF LA PORTE, INDIANA, ASSIGNOR TO U. S. SLICING MACHINE COMPANY, OF LA PORTE, INDIANA, A CORPORATION OF INDIANA.

BREAD SLICER.

Application filed December 31, 1923. Serial No. 683,547.

This invention relates to a device for slicing bread or other elongated material and has for its object the provision of a machine of the class named which shall be of improved construction and operation and which shall be provided with power driving mechanism.

The invention is exemplified in the combination and arrangement of parts shown in the accompanying drawings and described in the following specification, and it is more particularly pointed out in the appended claims.

Figures 1, 2:
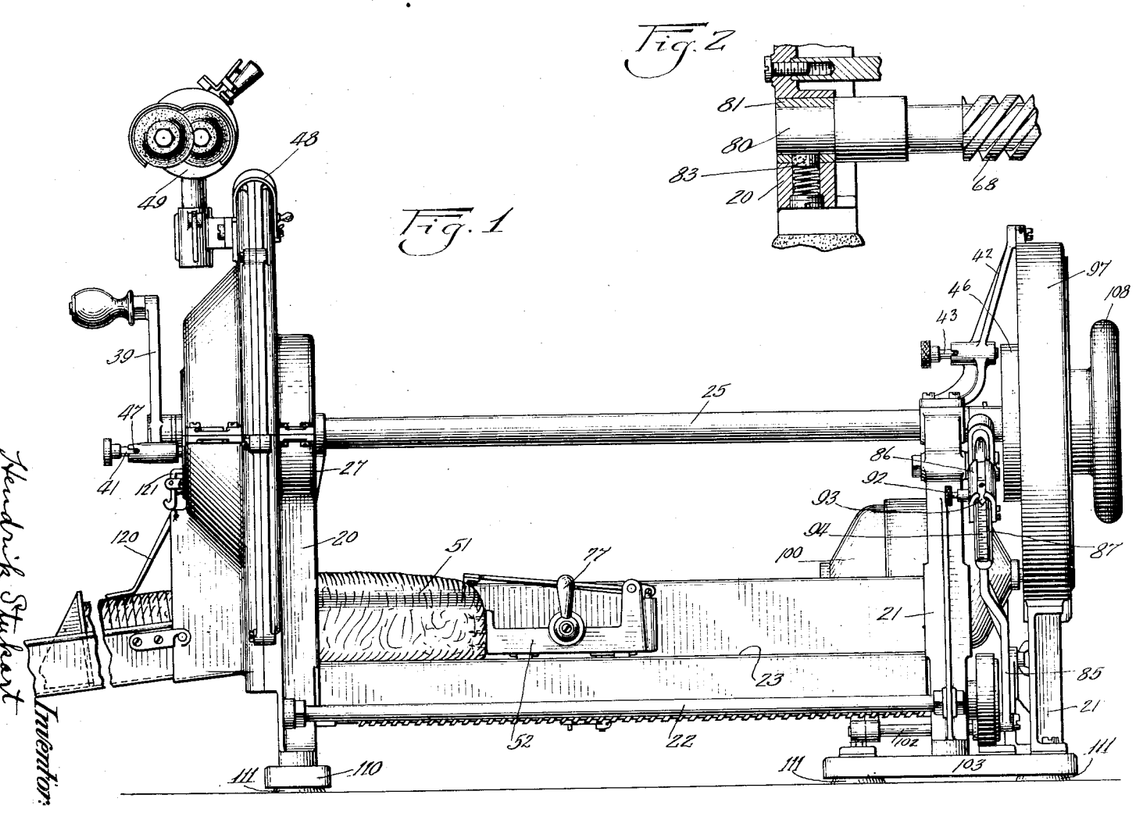
Fig 1 is a side elevation of a slicing machine showing one embodiment of the present invention.
Fig 2 is a fragmentary sectional detail.

As shown in Fig. 1, the slicing machine comprises a front frame member 20 and a rear frame member 21 connected by spacing rods 22 and a slideway 23 for the loaf to be sliced. A drive shaft 24 extends from front to rear of the machine and is journaled in the frames 20 and 21. A hollow tube or casing 25 surrounds the drive shaft 24 and serves as a spacing member between the front and rear frames.

Figures 9, 10:
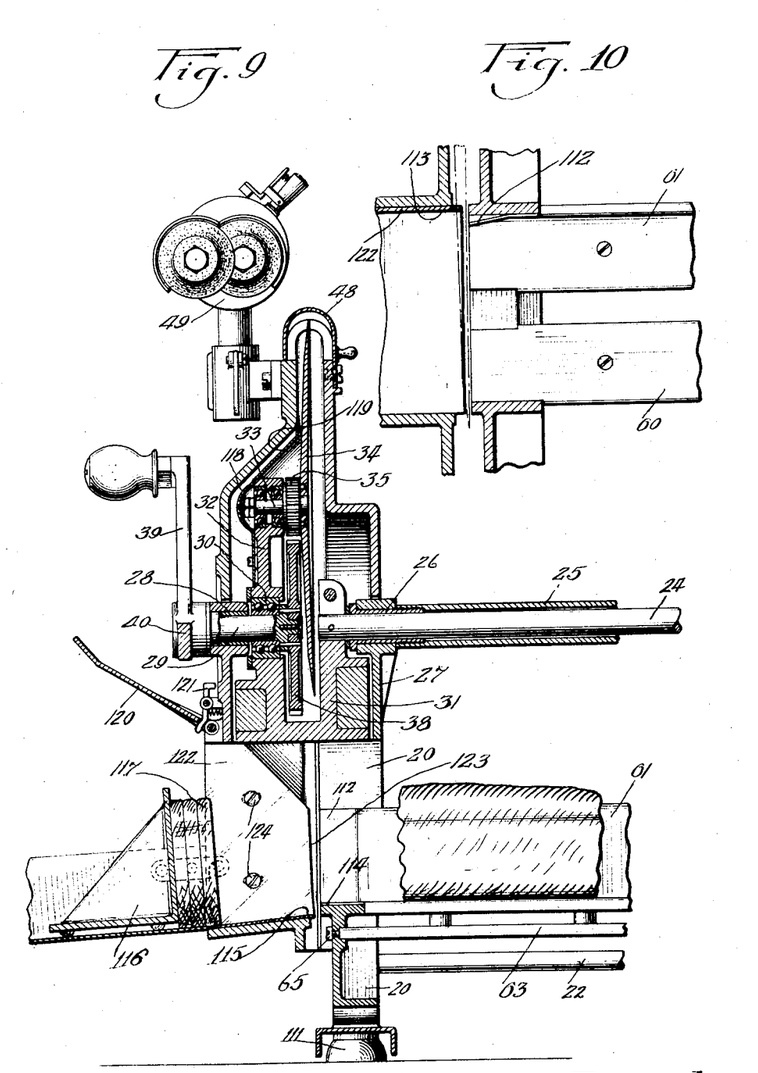
Fig. 9 is a vertical sectional view of the front end of the machine.
Fig. 10 is a top plan view of the front portion of the slideway for the loaf with the frame in section.

As shown in Fig. 9, the front frame member 20 is provided with a journal bearing 26 for the shaft 24 supported in the rear plate 27 of the frame member. A second bearing 28 in longitudinal alinement with the bearing 26 carries a stud shaft 29 having a bearing bushing 30 journaled thereon. A U-shaped bracket or counterweight 31 is secured to the forward end of the shaft 24 and is supported by the bearing 30 so as to rotate independently of the shaft 29 and in unison with the shaft 24. The bracket 31 carries an arm 32 having a shaft 33 journaled therein to which is secured a slicing knife 34. The knife 34 is concave on its rear face so that in operation the edge only of the knife will contact with the loaf from which the slices are being cut.

Figures 3, 4:
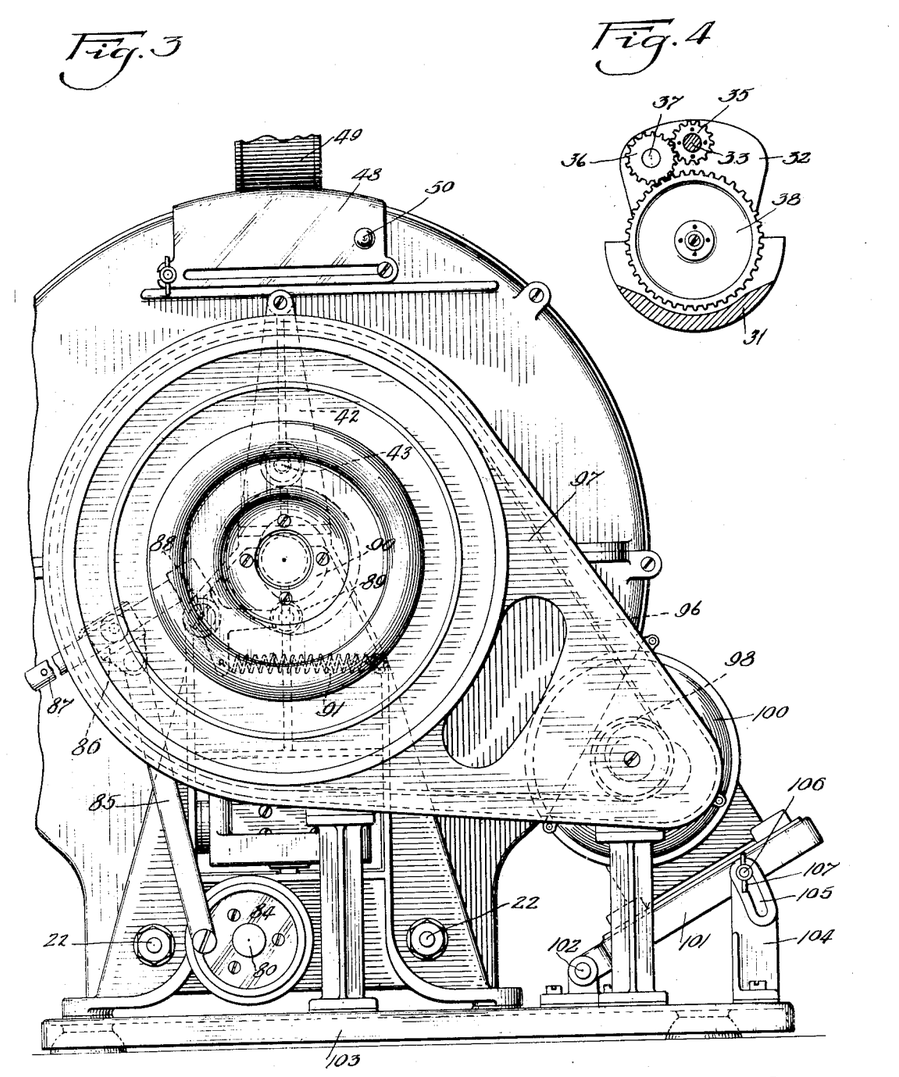
Fig. 3 is a rear end elevation.
Fig. 4 is a sectional detail showing the driving gears for the knife.

A pinion 35 is fixed to the shaft 33 and meshes with an idler 36 carried by a stud shaft 37 on the bracket 32, as shown in Fig. 4. The idler 36 meshes with a gear 38 secured to the rear end of the shaft 29. The front end of the shaft 29 is provided with a hand crank 39 and an arm 40 which is provided with a spring-pressed locking bolt 41 arranged to enter a depression in the casing member for the knife and thus lock the shaft 29 and gear 38 against rotation. It will be apparent that under these conditions rotation of the shaft 24 will cause the idler 36 to travel about the periphery of the gear 38 and thus impart a rotation to the disc knife 34 in a direction opposite to that of the rotation of the shaft 24.

Figure 8:
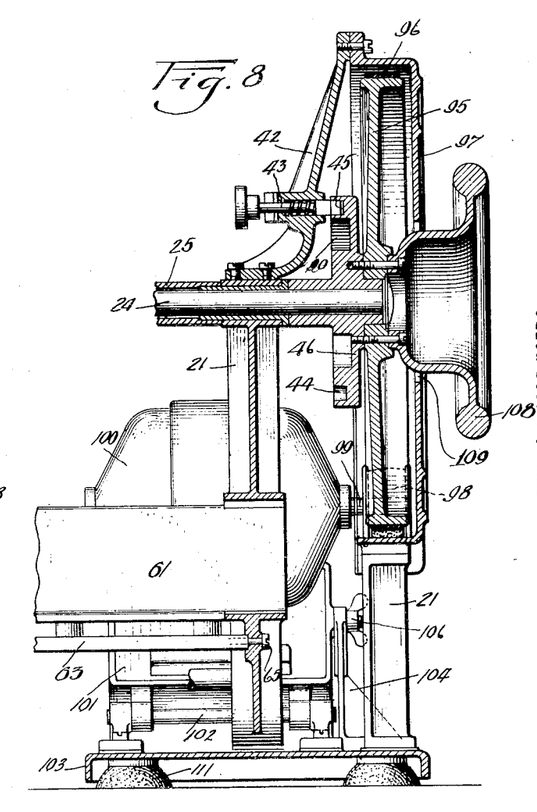
Fig. 8 is a vertical sectional view of the rear end of the machine.

As shown in Fig. 8, the rear frame 21 carries a bracket 42 having a spring bolt 43 similar to the bolt 41. The spring bolt 43 is arranged to enter either one of a pair of depressions 44 and 45 in a disc 46 secured to the rear end of the shaft 24. When the bolt 43 enters the depression 45 the arm 32 is locked in its uppermost position, as shown in Fig. 9. With the arm thus locked the bolt 41 may be withdrawn and held in a retracted position by a cross-pin 47. This will permit rotation of the hand crank 39 which in turn drives the pinions 36 and 35 and imparts rotation to the knife 34 about its own axis at a greater rate of speed than that caused by the rotation of the arm 32 about the axis of the drive shaft.

Figures 11, 12:
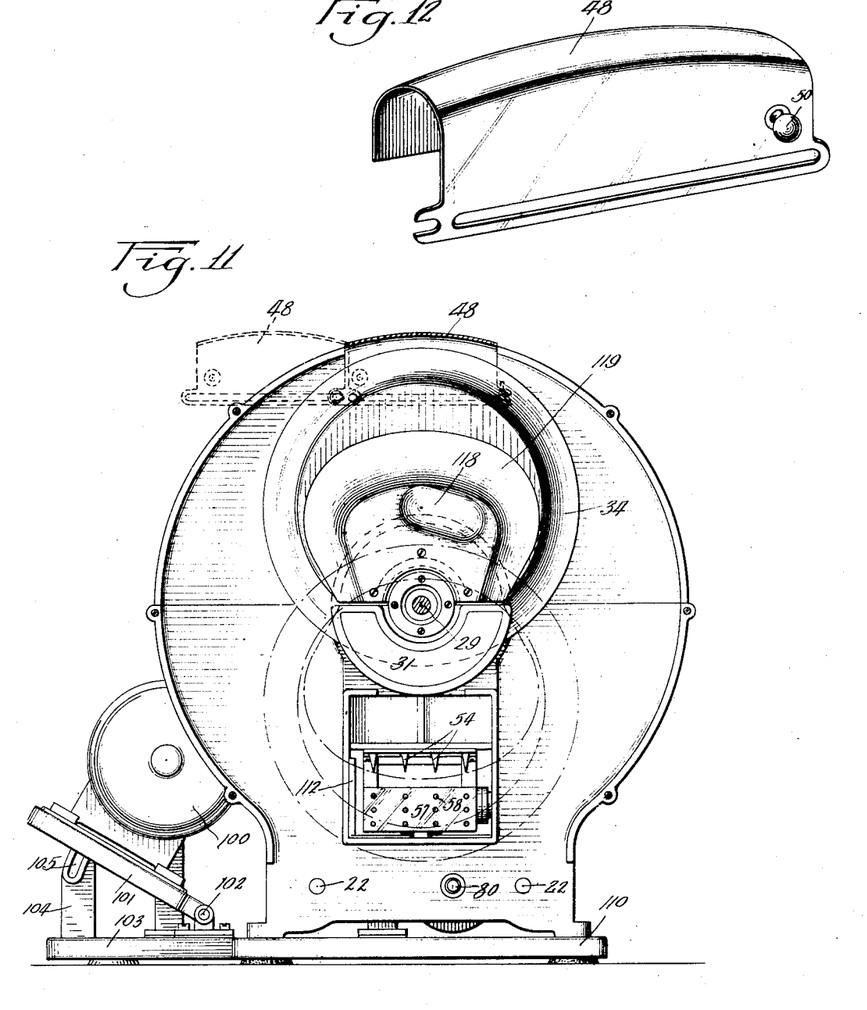
Fig. 11 is a vertical sectional view through the casing for the slicing knife.
Fig. 12 is a perspective view of the closure for the opening in the case through which the grinder operates.

The upper portion of the knife housing is provided with an opening which may be closed by a cover plate 48 shown more clearly in Figs. 3, 11 and 12. When the cover plate is withdrawn, as shown in broken lines in Fig. 11, the upper portion of the knife is accessible for sharpening. This operation may be accomplished by a grinder indicated generally by the numeral 49 which may be of any well-known and approved construction and which is movable into and out of position to engage the edge of the knife. It should be noted that the cover plate 48 slides to the right, as viewed in Fig. 3, and that it is provided with a handle 50 at its right-hand end so that in opening the cover the operator's hand moves away from the opening and not across the opening as would be the case if he should grasp the left-hand end of the cover plate. The knob 50 is purposely put in this position to prevent the operator from striking the edge of the knife when he opens the cover.

When the bolt 43 enters the depression 44 the knife 34 will be locked in its lowermost position in registration with the opening at the bottom of the frame 20 through which the loaf of bread is fed during slicing operations. By rotating the hand crank 39 with the blade in its lowermost position access may be had to the entire surface of the blade for cleaning or other purposes.

Figures 5, 6:
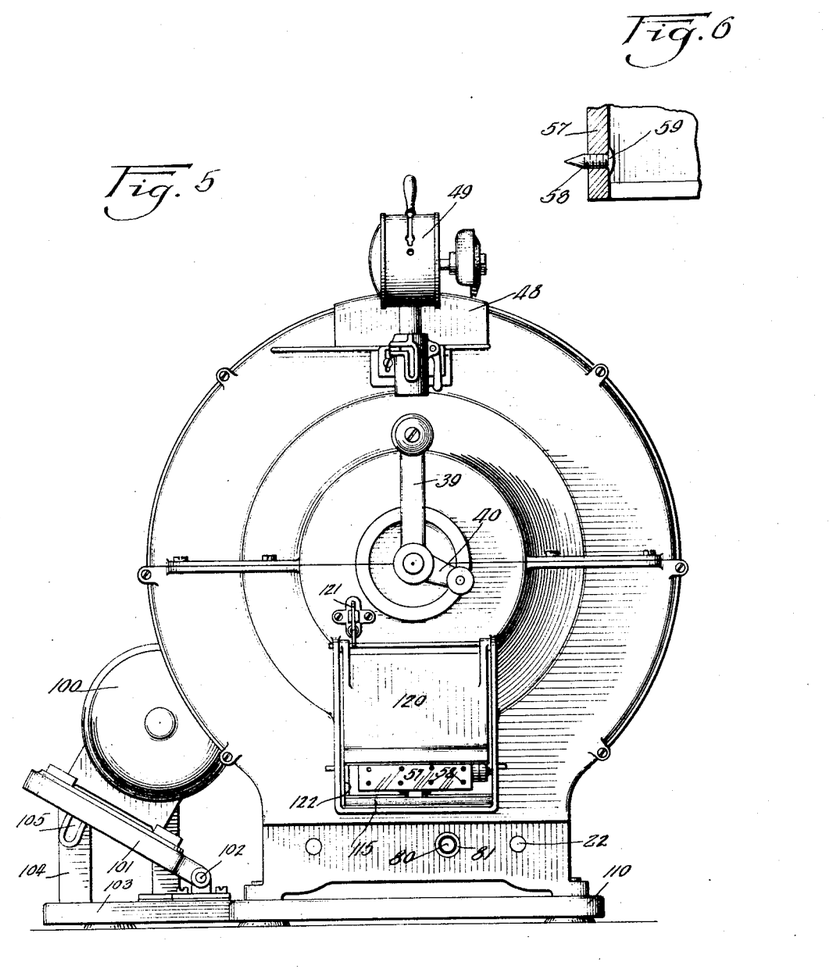
Fig. 5 is a front end elevation.
Fig. 6 is a sectional detail showing one of the holding prongs for the loaf.
Figure 7:
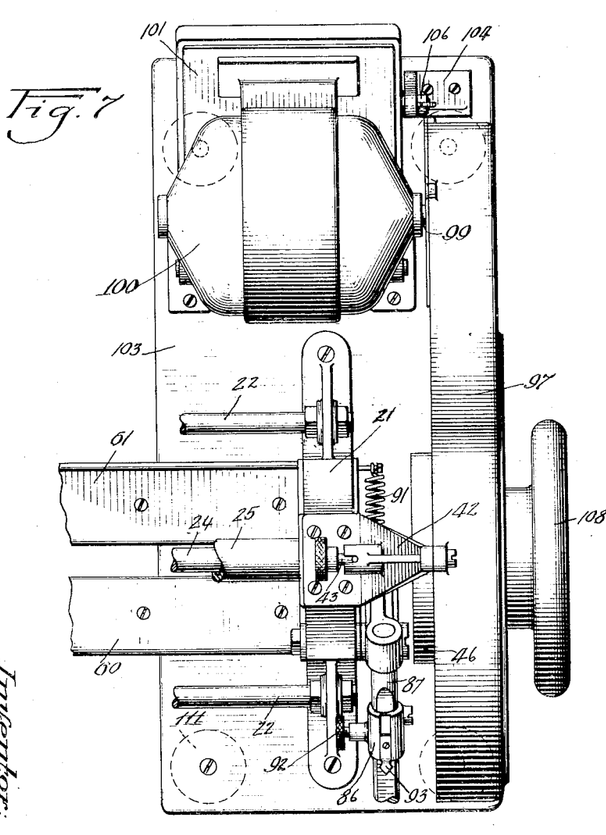
Fig. 7 is a top plan view of the rear end of the machine showing the driving motor.
Figures 13, 14, 15, 16, 17, 18:
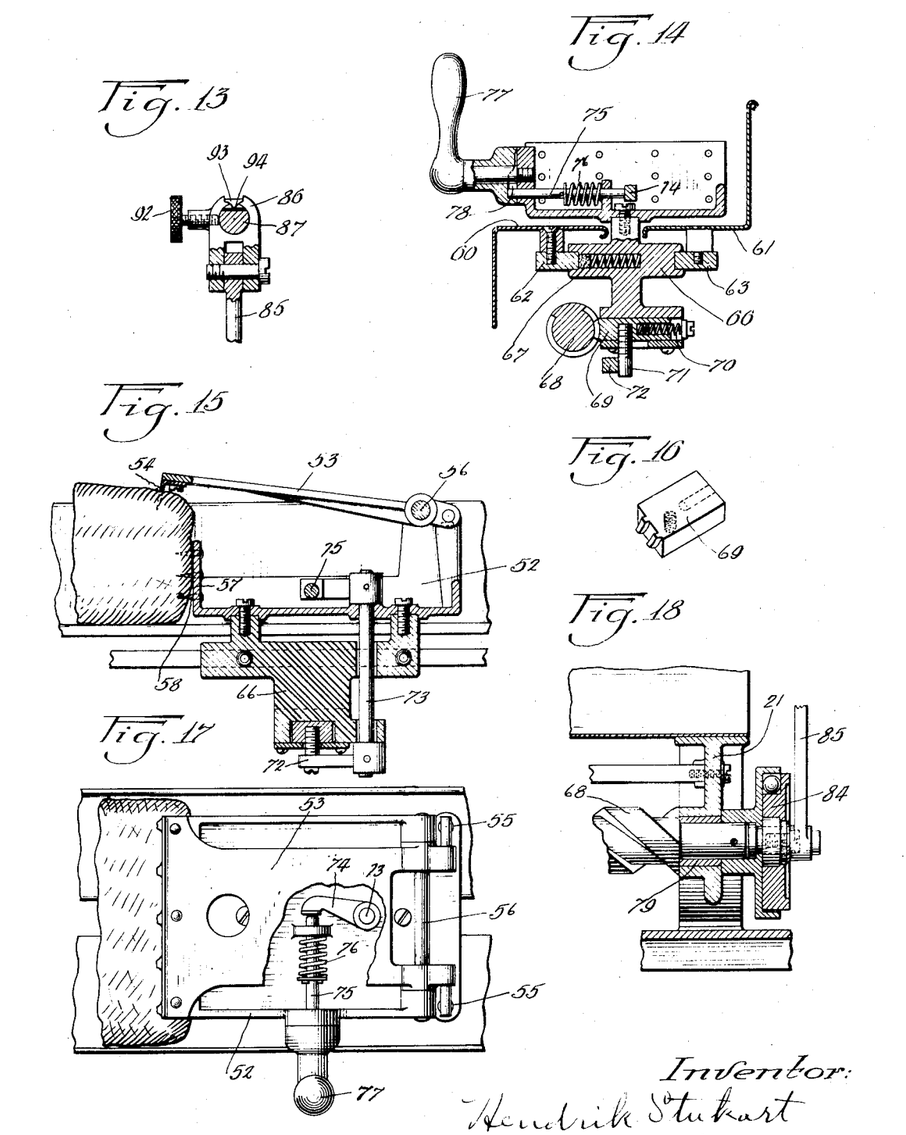
Fig. 13 is a detail showing the adjusting mechanism for changing the thickness of slices.
Fig. 14 is a transverse sectional view showing the connection between the loaf holder and its driving screw.
Fig. 15 is a longitudinal sectional view of the loaf holder.
Fig. 16 is a perspective view of the half nut or toothed member for engaging the driving screw.
Fig. 17 is a top plan view of the loaf holder.
Fig. 18 is a longitudinal sectional view showing the bearing for the rear end of the feed screw.

The loaf of bread 51 is fed along the slideway or support 23 by means of a follower 52. As shown in Fig. 15, the follower 52 is provided with a jaw 53 having downwardly extending teeth 54 for engaging the top of the loaf. The jaw 53 is forced downwardly upon the loaf by spring plungers 55 in the follower frame. A pivot rod 56 supports the jaw in position on the follower frame. At the front of the frame 52 there is an abutment plate 57 having forwardly projecting pins or teeth 58 for engaging the rear of the loaf, as shown in Fig. 6. These teeth may be threaded and screwed into the plate 57 from the front face, the rearwardly projecting end being headed over as shown at 59 to prevent any possibility of forward movement of the teeth relative to the plate. This precaution is desirable since the extreme forward movement of the follower brings the teeth 58 near to the path of the slicing knife and it should not be possible for the teeth to become unscrewed a sufficient distance to engage the slicing knife.

As shown in Fig. 14, the slideway 23 comprises a pair of sheet metal plates 60 and 61, the rear plate being bent upwardly to provide an abutment wall at the rear of the slideway, while the front plate is bent downwardly leaving the front face of the slideway entirely free and open so that it is easily accessible for placing the loaf in position. The plates 60 and 61 are supported on guide rails 62 and 63, respectively, which extend from the front frame 20 to the rear frame 21 and are held in place by screws 65, as shown in Figs. 8 and 9.

The follower frame 52 is supported on a runner 66 which slides upon the guides 62 and 63 and projects upwardly through the central slot between the plates 60 and 61. A spring friction member 67 bears against the rail 62 to prevent overthrow during the feeding operation of the follower. A feed screw 68 is journaled beneath the slideway 23 and engages a toothed member 69 carried by the runner 66. A spring 70 normally presses the toothed member 69 into engagement with the feed screw 68 and a stud 71 projects downwardly into position to engage an arm 72 carried by an upright disc shaft 73. At the upper end of the disc shaft 73 a finger 74 engages a plunger 75 which is held in retracted position by a spring 76. The plunger 75 may be projected against the finger 74 by a handle 77 mounted on the follower 52. The handle 77 is provided with a cam face 78 for this purpose, as shown in Fig. 4, so that movement of the handle 77 in either direction will project the plunger 75 and release the nut 69. To adjust the follower on the slideway 23, therefore, it is only necessary to grasp the handle and force it in the direction in which it is desired to move the follower, the operation releasing the toothed member 69.

The feed screw 68 is journaled at its rear end in a bushing 79 in the frame member 21, the screw having a reduced portion to provide a shoulder which bears against the bushing and frame member and takes the thrust due to the forward feeding movement of the follower 52 at its forward end. The feed screw 68 is provided with a reduced bearing portion 80 which is journaled in a bushing 81 carried in an opening in the frame member 20. The opening through the frame member is of sufficient size to permit the feed screw 68 to be passed rearwardly therethrough when the machine is assembled, after which the bushing 81 is placed in position and held in place by a spring-pressed plug 83. This arrangement permits the bearing openings for the shaft 68 to be finished in alinement after the frame parts have been assembled, after which the shaft may be placed in position. If the shaft 68 were placed in position at the time the frame parts are secured together it would be necessary to assemble the frame parts and aline the bearing openings, after which the frame parts would have to be disconnected to insert the shaft 68.

It will be noted from Fig. 2 that the threads on the feed screw 68 terminate short of the forward end of the screw and that the forward end of the screw is provided with a solid shoulder portion. During the feeding operation the toothed member 69 is fed forwardly past the threads into the space between the threads and the abutment member, at which point the follower 52 is arrested against further forward movement. The parts are so proportioned that the follower is arrested close to the path of movement of the knife, but sufficiently removed therefrom to prevent contact of the edge of the knife against the clamping means for the loaf.

The rear end of the feed shaft 68 is provided with a one-way ball clutch drive 84 actuated by a link 85, the upper end of which is pivoted to a sleeve 86 slidably mounted on an arm 87 which is pivoted at 88 on the rear frame member 21. A roller 89 is carried on the opposite end of the arm 87 from the sleeve 86 and bears against a cam 90 on the main drive shaft 24. A spring 91 normally holds the roller 89 against the face of the cam 90. Rotation of the main drive shaft oscillates the arm 87 which is transmitted to the one-way clutch 84 by the link 85, thus imparting intermittent rotation to the feed screw 68 and advancing the follower 52 one step for each rotation of the main drive shaft. The amount of movement and consequently the thickness of the slices is regulated by the position of the sleeve 86 on the arm 87. A thumb screw 92 is provided for holding the sleeve 86 in its adjusted positions and an indicator 93 is attached to the sleeve 86 and registers with a scale 94 on the arm 87 to indicate the thickness of the slice.

As shown best in Fig. 8, the rear end of the drive shaft 24 is provided with a fly-wheel 95 about which a belt 96 passes. The belt 96 is enclosed in a housing 97 and engages a drive pulley 98 carried by the shaft 99 of a motor 100. The housing 97 is supported by the frame 21 and the bracket 42. The motor 100 is mounted on a base 101 which is pivotally supported at 102 on a base plate 103 upon which the main frame of the slicing machine rests. The motor 100 may be swung upon its pivotal support 102 to adjust the position of the drive pulley 98 and regulate the tension in the belt 96. A bracket 104 is carried by the base plate 103 and provided with a slot 105 through which a stud bolt 106 extends. The bolt 106 is attached to the motor base 101 and is provided with a wing nut 107 by which the motor base may be locked in its adjusted positions if desired. In some cases it may be found advisable to leave the wing nut loose so that the weight of the motor will exert tension on the driving belt and thus automatically keep the belt taut.

An auxiliary wheel 108 may be attached to the fly-wheel 95 and extend through an opening 109 in the casing 97, thus providing means for turning the shaft 24 by hand. A supporting bar or plate 110 is provided for the front frame member 20 in order to support both ends of the machine at the same height. The plates 103 and 110 are provided with resilient feet 111 and are separable from the frame parts of the machine.

The arrangement is such that the slicing machine may be readily converted from a hand to a power machine, or vice versa, as circumstances may warrant. If a hand machine is desired it is only necessary to remove the auxiliary wheel 108 and the casing 97 and lift the machine from the supports 103 and 110. A proper handle is then attached to the fly-wheel 95 for hand operation. If an operator is already supplied with a hand machine it may be readily transformed into a power machine by supplying the supports 103 and 110 with their accompanying parts, including the motor, driving belt and casing. This enables an operator to purchase a hand machine and later if he finds his business requires a power machine the additional parts may be supplied and the machine easily transformed into a power machine.

At the front of the runway 23 and against the rear wall of the opening through which the loaf of bread is fed, it has been found advisable to provide an inwardly projecting abutment shown at 112 in Fig. 10 of the drawings. This insures a support for the loaf at the side toward which the knife is moving during a cutting operation. The abutment 112 extends beyond the face 113 of the receiving chute so that the slice is free from support at the point where the cutting takes place. This prevents the slice from being drawn into the slot through which the knife passes and insures a clean shearing action. For the same reason the bottom of the runway, as shown at 114 in Fig. 9 of the drawings, is elevated above the bottom 115 of the slice-receiving chute. It will be noted that the slice-receiving chute 115 is inclined downwardly away from the knife and a follower 116 is provided in the chute against which the slices 117 rest in a position inclined to the vertical, but substantially normal to the bottom of the receiving pan. The slices are moved into their inclined position by the housing 118 which encloses the driving gears for the knife. This housing is provided with a beveled face 119 which engages the slices while they are being cut and tilts them into their inclined position and at the same time separates the slices from the loaf so as to provide passage for the driving gears for the knife 84.

If a very high loaf is used the top of the slice may be bent forwardly an amount sufficient to permit the blade to extend even past the supporting shaft 33 between the slice and the loaf. This permits slicing a larger loaf for a given sized knife than would be possible if the gear casing 119 were not provided with a beveled wedging portion to separate the slice from the loaf while it is being severed. This feature is of great importance in maintaining as small a casing as possible for the slicing knife. Any increase in the diameter of the knife necessary for cutting slices of the required size is magnified in the knife casing since the orbit of the knife is increased about its entire periphery an amount equal to the increase in the radius of the blade.

A safety closure 120 is provided for the front face of the opening in the frame 30 so that accidental contact with the knife is avoided when the machine is not in use. The closure 120 may be provided with a catch 121 for holding it in its open position when the machine is being operated. A plate 122 is adjustably secured to the frame 20 at the front side of the slot through which the knife passes and against the face of the opening toward which the knife moves during a slicing operation. This plate 122 has its rear edge 123 shaped to conform to the contour of the knife and is adjustably held in place by screws 124 so that it may be accurately positioned to close the slot through which the knife passes. This close fit is desired to prevent the slices from being drawn into the slot and in conjunction with the offset relation of the face 42 has been found very efficient in preventing mutilation of the slices in this way.

I claim:—

1. A bread slicing machine comprising a drive shaft, a knife mounted upon an axis eccentric of said drive shaft and bodily moved by said drive shaft for severing slices from a loaf of bread, means for rotating said knife about said axis while said axis is held stationary and a power motor for rotating said drive shaft.

2. A slicing machine comprising a drive shaft, a disc knife connected with said drive shaft with its axis offset relative to the axis of said drive shaft, a counterweight for said disc knife secured to said drive shaft, means for rotating said disc knife about its own axis when said drive shaft is rotated to bodily move said knife about the axis of said drive shaft, and a power motor for operating said drive shaft.

3. A slicing machine comprising a drive shaft, a U-shaped bracket secured to said drive shaft, a disc knife connected with said drive shaft and journaled to rotate about an axis spaced from the axis of said drive shaft, said knife extending past the axis of said drive shaft within the opening in said U-shaped bracket, planetary gearing for rotating said knife about its own axis when said drive shaft is rotated to move said knife bodily about the axis of said drive shaft, said U-shaped bracket being weighted to supply a counterweight for said knife, and a power motor for rotating said drive shaft.

4. A slicing machine comprising a main frame a base plate on which said main frame detachably rests, and a power motor mounted on said base plate in position to drive said slicing machine when said main frame rests on said base plate.

5. A slicing machine comprising a main frame having front and rear frame portions, separate auxiliary supports for said front and rear frame portions upon which said front and rear portions detachably rest respectively, and a power motor mounted on one of said auxiliary supports in position to drive said slicing machine when said main frame rests on said support.

6. A slicing machine comprising a main frame member, a slicing knife, actuating mechanism for said knife mounted on said main frame member, the whole constituting an operable machine adapted to be hand actuated, a base plate, a power motor mounted on said base plate, and means for detachably connecting said base plate with said main frame member to retain said power motor in position to drive said slicing machine.

7. A slicing machine comprising a main frame, a slicing knife mounted on said main frame, actuating mechanism mounted on said main frame, the whole constituting an operable unit adapted to be hand actuated, an auxiliary supporting base plate on which said main frame is adapted to rest, a motor pivotally mounted on said base plate, and means for driving said actuating mechanism from said motor when said main frame is in position on said base plate.

8. A slicing machine comprising a main frame, a slicing knife mounted on said main frame, actuating mechanism for said slicing knife mounted on said main frame, the whole constituting an operable unit adapted to be hand actuated, an auxiliary supporting base plate upon which said main frame is adapted to rest, a motor pivotally mounted on said auxiliary base plate, and a belt for connecting said motor to said actuating mechanism in position to sustain a portion of the weight of said motor.

9. A slicing machine comprising a main frame, a drive shaft mounted on said main frame, a slicing knife connected with said drive shaft and actuated thereby, a drive wheel connected with said shaft, an auxiliary base plate upon which said main frame is detachably supported, a base member pivotally mounted on said auxiliary base plate, a motor carried by said base member, means for retaining said base member in various angular positions upon its pivot, a drive pulley on said motor, a belt connecting said drive pulley and said drive wheel, and a housing for said belt detachably connected with said main frame for positioning said auxiliary base plate and motor in operative relation relative to said drive wheel.

10. A slicing machine comprising a disc knife, means for moving said knife bodily about an axis spaced from the axis of said knife, a power motor for driving said moving means, means for holding said knife against bodily movement, hand actuated means separate from said moving means for rotating said knife about its own axis when so held, and a sharpening device for engaging said knife during said hand operation.

11. A slicing machine comprising a disc knife, a main drive shaft, means for supporting said knife in offset relation relative to the axis of said main drive shaft, a power motor for rotating said drive shaft to carry said knife bodily about the axis of said main drive shaft to engage an article to be sliced, means for rotating said knife upon its own axis during bodily movement thereof, means for locking said knife against bodily movement, hand actuated means for rotating said knife about its own axis when locked against bodily movement, and a sharpening device for engaging said knife during hand operation thereof.

12. A slicing machine comprising a rotary knife, means for supporting said knife for movement about an axis spaced from the axis of said knife, means for locking said knife against bodily movement in two different positions, and means for rotating said knife about its own axis when locked in either one of said positions.

13. A slicing machine comprising a rotary knife, means for supporting said knife for movement in an orbit about an axis spaced from the axis of said knife, a casing for enclosing said knife in its orbital movement and having an opening therethrough to admit material into the path of said knife to be sliced, means for locking said knife against orbital movement while extending into said opening, and means for rotating said knife about its own axis while so locked to bring the various portions of said knife into said opening.

14. A slicing machine comprising a rotary knife, means for moving said knife bodily past a slicing position to perform a slicing operation, and means for locking said knife in said slicing position to expose said knife to be cleaned.

15. A slicing machine comprising a casing having an opening therethrough, a knife arranged to move bodily past said opening to slice material positioned in said opening, means for locking said knife against bodily movement when extending into said opening, and means for rotating said knife while so locked to bring various portions thereof into said opening to permit said knife to be cleaned.

16. A slicing machine comprising a casing having an opening therethrough, a rotary knife mounted in said casing and bodily movable past said opening to perform slicing operations, a second opening in said casing, and means for locking said knife against bodily movement in two different positions in which a portion of said knife extends into one or the other of said openings.

17. A slicing machine comprising a casing having an opening therein, a rotary knife mounted in said casing to move bodily past said opening to perform slicing operations, said casing having a second opening therein spaced from said first-mentioned opening, means for locking said knife against bodily movement in two different positions in which a portion of said knife extends into one or the other of said openings, means for rotating said knife upon its own axis when locked against bodily movement, and a sharpener arranged to engage said knife when locked in position to extend into said second-mentioned opening.

18. A slicing machine comprising a casing having an opening therein, a slicing knife mounted in said casing and bodily movable therein, means for locking said knife in position to project into said opening, a cover for said opening mounted on said casing and movable in one direction away from said opening, and a handle for said cover connected thereto adjacent the portion thereof toward which said cover moves away from said opening.

19. A slicing machine comprising a casing having an opening therein, a knife mounted in said casing and arranged to project into said opening, a closure for said opening arranged to move into either closed or opened position, and a handle for said closure connected to said closure at the side thereof away from said opening when said closure is moved into open position.

20. In a slicing machine, a support for an article to be sliced having an abutment wall beyond which said article projects during a slicing operation, and a knife arranged to move toward said wall and past the edge thereof during a slicing operation, said wall having an abutment portion projecting from the plane thereof toward said article at the edge adjacent said knife.

21. A bread slicing machine comprising a slideway for a loaf of bread, a slicing knife mounted to move past the end of said slideway, and an abutment wall at the side of said slideway toward which said knife moves, said abutment wall being shaped to project inwardly at the end of said slideway to provide a support for engaging the loaf of bread at the end of said slideway and adjacent said knife.

22. A slicing machine comprising a slideway for a loaf of bread, said slideway having one side thereof open and having an abutment wall at the opposite side thereof, a slicing knife arranged to move past the end of said slideway for severing slices from a loaf of bread, a receiver spaced from the end of said slideway to provide passage for a knife between said slideway and receiver, said receiver being offset downwardly from the bottom of said slideway, and a projecting abutment at the side of said slideway toward which said knife moves and at the end thereof adjacent said knife.

23. A slicing machine comprising a support for an article to be sliced, a knife arranged to move past one edge of said support to sever slices from an article thereon, a receiver for said slices spaced from said support to provide a passage for said knife, and a plate supported adjacent the path of said knife at the side thereof opposite said support and adjustably mounted for movement toward and from said knife.

24. A slicing machine comprising a support for an article to be sliced, a disc-shaped knife movable past one edge of said support for severing slices from said article, a plate spaced from said edge of said support, the edge of said plate being shaped to conform to the face of said knife opposite said support, and means for adjustably holding said plate in position with the edge thereof adjacent the path of said knife.

25. A slicing machine comprising a support for an article to be sliced, means for feeding said article to project beyond one edge of said support, a concavo convex disc knife movable past the edge of said support to sever slices from said article, said knife having its concave face adjacent said support, means for rotating said knife about an axis spaced from the axis thereof to move said knife bodily past said support, and means for rotating said knife upon its own axis in a direction of rotation opposite to its rotation about said spaced axis during a slicing operation.

26. A slicing machine comprising a support for an article to be sliced, a slicing knife movable bodily past one edge of said support, a follower for feeding articles along said support toward said knife, pins projecting from said follower in the direction of movement thereof for engaging the rear face of said article, and a clamping device for engaging the top of said article.

27. A slicing machine comprising a slideway, a follower having an abutment plate for engaging the rear face of an article to move said article along said slideway, and a pin projecting forwardly from the engaging face of said plate, said pin being threaded through said plate from the front to the rear thereof and having a rearwardly projecting portion headed over to prevent unscrewing of said pin from said plate.

28. A slicing machine comprising a drive shaft, means for locking said drive shaft against rotation, said locking means comprising a member having a tapered opening therein, and a bolt arranged to be projected into said opening and having the end thereof tapered to conform with the taper of said opening.

29. A slicing machine comprising a slicing knife, a drive shaft for moving said knife bodily, means for locking said drive shaft to hold said knife in fixed position, said locking means comprising a member secured to said drive shaft and having a pair of openings therein, a spring-pressed bolt for selectively engaging said openings and a stop for retaining said bolt in retracted position to permit free rotation of said drive shaft.

In testimony whereof I have signed my name to this specification on this 27th day of December, A. D. 1923.

HENDRIK STUKART.